United States Patent
Minamisawa et al.

(10) Patent No.: US 12,510,722 B2
(45) Date of Patent: Dec. 30, 2025

(54) CASE AND OPTICAL UNIT (71) Applicant: NIDEC SANKYO CORPORATION, Nagano (JP)

(72) Inventors: Shinji Minamisawa, Nagano (JP); Tsutomu Arai, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 1009 days.

(21) Appl. No.: 17/493,873

(22) Filed: Oct. 5, 2021

(65) Prior Publication Data
US 2022/0113488 A1 Apr. 14, 2022

(30) Foreign Application Priority Data

Oct. 13, 2020 (JP) .................................. 2020-172647
Jul. 14, 2021 (JP) .................................. 2021-116518

(51) Int. Cl.
*G02B 7/02* (2021.01)
(52) U.S. Cl.
CPC ..................................... *G02B 7/02* (2013.01)
(58) Field of Classification Search
None
See application file for complete search history.

(56) References Cited

U.S. PATENT DOCUMENTS

| 9,291,832 B2 | 3/2016 | Minamisawa et al. | |
| 2008/0192124 A1* | 8/2008 | Nagasaki | G02B 7/08 348/E5.04 |
| 2012/0250156 A1* | 10/2012 | Asakawa | G03B 5/00 359/554 |
| 2020/0174273 A1* | 6/2020 | Minamisawa | G03B 5/02 |

FOREIGN PATENT DOCUMENTS

JP 2011232708 11/2011

* cited by examiner

*Primary Examiner* — Stephone B Allen
*Assistant Examiner* — Tamara Y. Washington
(74) *Attorney, Agent, or Firm* — JCIPRNET (57) ABSTRACT

A case to hold a movable unit, which is provided with an optical module and a flexible circuit board having one end connected to the optical module, in a swingable manner that the optical module is swingable, is provided. The case includes: a holder, swingable together with the optical module to house the optical module; a fixing portion, provided at the holder to fix the flexible circuit board; and a pedestal, provided at the holder and having a placing face along which the flexible circuit board is disposed at a side opposite to a side of the one end with respect to an area fixed to the fixing portion in the flexible circuit board, and the pedestal is provided in a configuration in which a swing center of the optical module is positioned on an extended line of the placing face.

10 Claims, 9 Drawing Sheets

CASE AND OPTICAL UNIT

CROSS REFERENCE TO RELATED APPLICATION

The present invention claims priorities under 35 U.S.C. § 119 to Japanese Application No. 2020-172647 filed Oct. 13, 2020, and Japanese Application No. 2021-116518 filed Jul. 14, 2021, and the entire contents of which are incorporated herein by reference.

BACKGROUND

Field of the Invention

At least an embodiment of the present invention relates to a case and an optical unit.

Description of the Related Documents

Conventionally, various optical units have been used that have a movable body having an optical module and an imaging element, and a case that holds the movable body in a swingable manner. For example, JP 2011-232708 discloses an optical unit provided with a movable module having a lens and an imaging element, and a fixed body to hold the movable module in a swingable manner.

In the conventional optical unit provided with the movable body having the optical module and the imaging element, and the case that holds the movable body in a swingable manner, a flexible circuit board is connected to the movable body, so that when the movable body swings relative to the case, a load is applied to the flexible circuit board. If a strong load is applied to the flexible circuit board, the flexible circuit board may be damaged or the swinging of the movable body relative to the case may be disturbed depending on the rigidity of the flexible circuit board. Therefore, it is necessary to reduce the load applied to the flexible circuit board, but in conventional optical unit, the configuration to reduce the load applied to the flexible circuit board tends to be complicated. Therefore, it is an object of at least an embodiment of the present invention to reduce, with a simple configuration, the load applied to the flexible circuit board.

SUMMARY

A case of at least an embodiment of the present invention is a case to hold a movable unit, which is provided with an optical module and a flexible circuit board having one end connected to the optical module, in a swingable manner that the optical module is swingable, and the case including: a holder, being swingable together with the optical module and housing the optical module; a fixing portion, being provided at the holder to fix the flexible circuit board; and a pedestal, being provided at the holder, and having a placing face along which the flexible circuit board is disposed at a side opposite to a side of the one end with respect to an area fixed to the fixing portion in the flexible circuit board. And, the pedestal is provided in a configuration in which a swing center of the optical module is positioned on an extended line of the placing face.

Depending on the arrangement of the flexible circuit board, the load applied to the flexible circuit board when the optical module is swung relative to the case greatly varies. However, arranging the flexible circuit board so that the swing center of the optical module is positioned on the extended line of the flat area of the flexible circuit board can reduce the load applied to the flexible circuit board when the optical module is swung relative to the case can be reduced. And, according to the present mode, with the simple configuration of the pedestal having the placing face, causing the flexible circuit board to be along the placing face of the pedestal can arrange the flexible circuit board such that the swing center of the optical module is positioned on the extended line of the flat area of the flexible circuit board. Therefore, the load applied to the flexible circuit board can be reduced with a simple configuration.

In an optical unit of at least an embodiment of the present invention, the optical module is housed in the holder in the swingable manner, and the flexible circuit board is fixed to the fixing portion, so that the movable unit is held by the case. Making such a configuration allows the optical unit to have a simple configuration that reduces the load applied to the flexible circuit board.

In the optical unit of at least an embodiment of the present invention, a reinforcing plate is provided to be fixed to a face of the flexible circuit board, and the fixing portion has a groove portion into which the reinforcing plate is inserted. Making such a configuration can make the fixing portion of a simple configuration in which the reinforcing plate to which the flexible circuit board is fixed is simply inserted into the groove portion.

In the optical unit of at least an embodiment of the present invention, the groove portion is configured in positions corresponding to both end portions of a longitudinal direction of the reinforcing plate and on both sides in a direction intersecting an insertion direction of the reinforcing plate, and extends toward the placing face in a direction along the insertion direction of the reinforcing plate. Making such a configuration can easily form a configuration in which the flexible circuit board is fixed to the fixing portion and the flexible circuit board is caused to be along the placing face.

In the optical unit of at least an embodiment of the present invention, the reinforcing plate is configured to be press-fitted into the groove portion and is attached with an adhesive. Making such a configuration can, with a simple configuration, securely fix the reinforcing plate to the groove portion.

In the optical unit of at least an embodiment of the present invention, the reinforcing plate is made of stainless steel or polyimide. Making such a configuration allows the reinforcing plate to be formed easily and sturdily, and also reduces the risk of contaminating the flexible circuit board.

In the optical unit of at least an embodiment of the present invention, the fixing portion includes: a pressing portion that is configured separately from the flexible circuit board, and presses the flexible circuit board which is in a state of being placed on the placing face toward one face of the holder; and a groove portion into which the pressing portion being inserted. Even in a case where the reinforcing plate cannot be fixed to the flexible circuit board, making such a configuration, can make the fixing portion that has a simple configuration in which the pressing portion is simply inserted into the groove portion.

In the optical unit of at least an embodiment of the present invention, the groove portion is configured in positions corresponding to both end portions of a longitudinal direction of the pressing portion and on both sides in a direction intersecting an insertion direction of the pressing portion, and extends toward the placing face in a direction along the insertion direction of the pressing portion. Making such a configuration can easily form a configuration in which the flexible circuit board is fixed to the fixing portion and the flexible circuit board is caused to be along the placing face.

In the optical unit of at least an embodiment of the present invention, the pressing portion is configured to protrude relative to the flexible circuit board which is in a state where an upstream end portion in the insertion direction of the pressing portion is fixed to the fixing portion. Making such a configuration makes it easier to insert the pressing portion into the groove portion.

In the optical unit of at least an embodiment of the present invention, the pressing portion is arranged such that a distance between a downstream end portion of the pressing portion in the insertion direction and the placing face is greater than a thickness of the flexible circuit board. Making such a configuration can suppress the flexible circuit board from being damaged by pressing at a strong force, with the pressing portion, the flexible circuit board to the placing face.

In the optical unit of at least an embodiment of the present invention, the flexible circuit board includes a plurality of flexible circuit boards stacked with each other, and the flexible circuit board is arranged so that the distance is greater than an overall thickness of the plurality of flexible circuit boards that are stacked.

In the optical unit of at least an embodiment of the present invention, the flexible circuit board includes a single flexible circuit board.

In the optical unit of at least an embodiment of the present invention, the pressing portion is configured to be press-fitted into the groove portion and is attached with an adhesive. Making such a configuration can securely fix the pressing portion to the groove portion with a simple configuration.

In the optical unit of at least an embodiment of the present invention, the pressing portion is made of stainless steel or polyimide. Making such a configuration allows the pressing portion to be formed easily and sturdily, and also can reduce the risk of contaminating the flexible circuit board.

An optical unit of at least an embodiment of the present invention can reduce, with a simple configuration, a load applied to a flexible circuit board.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Figure 1:
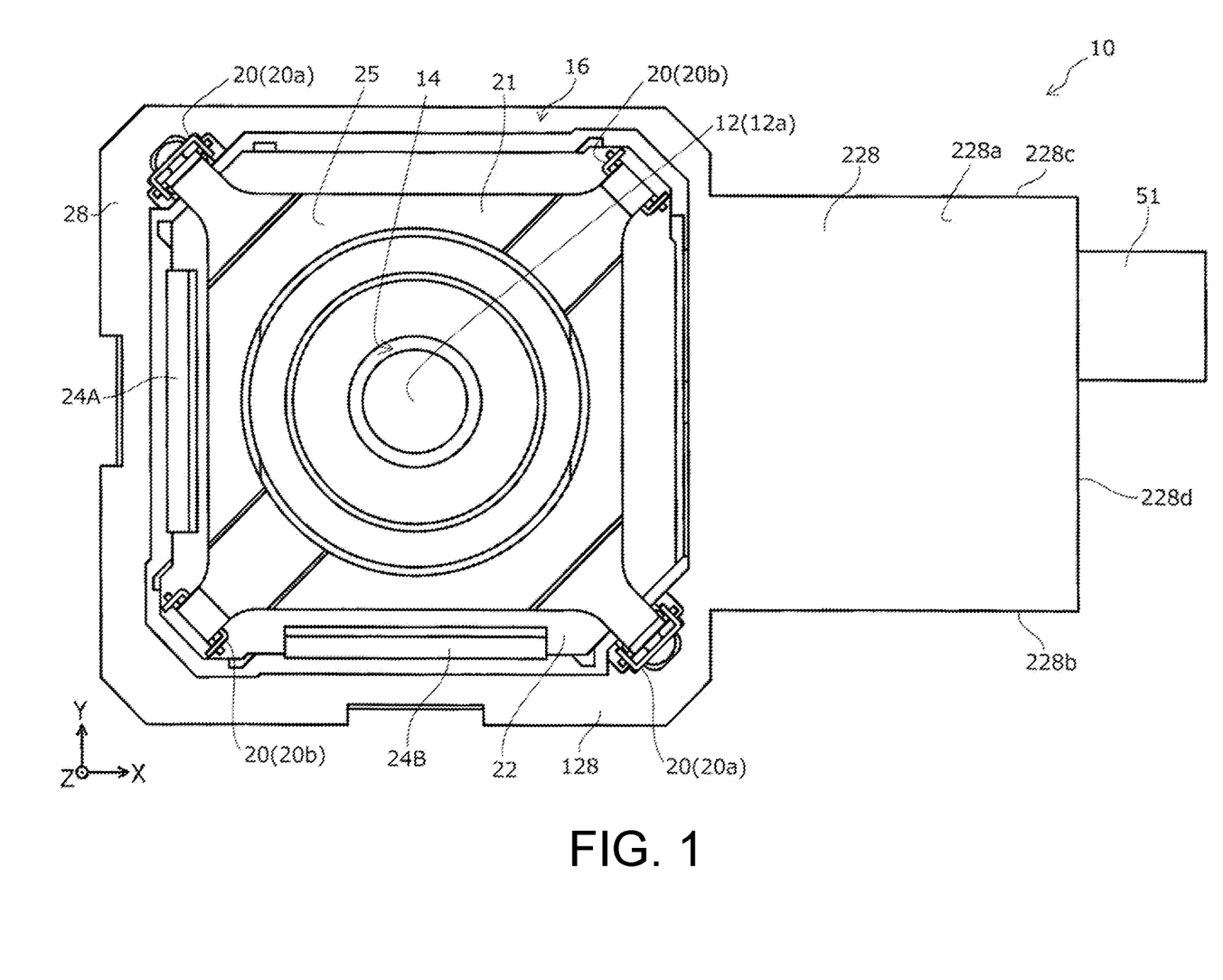
FIG. 1 is a plan view of an optical unit according to at least an embodiment of the present invention.
Figure 2:
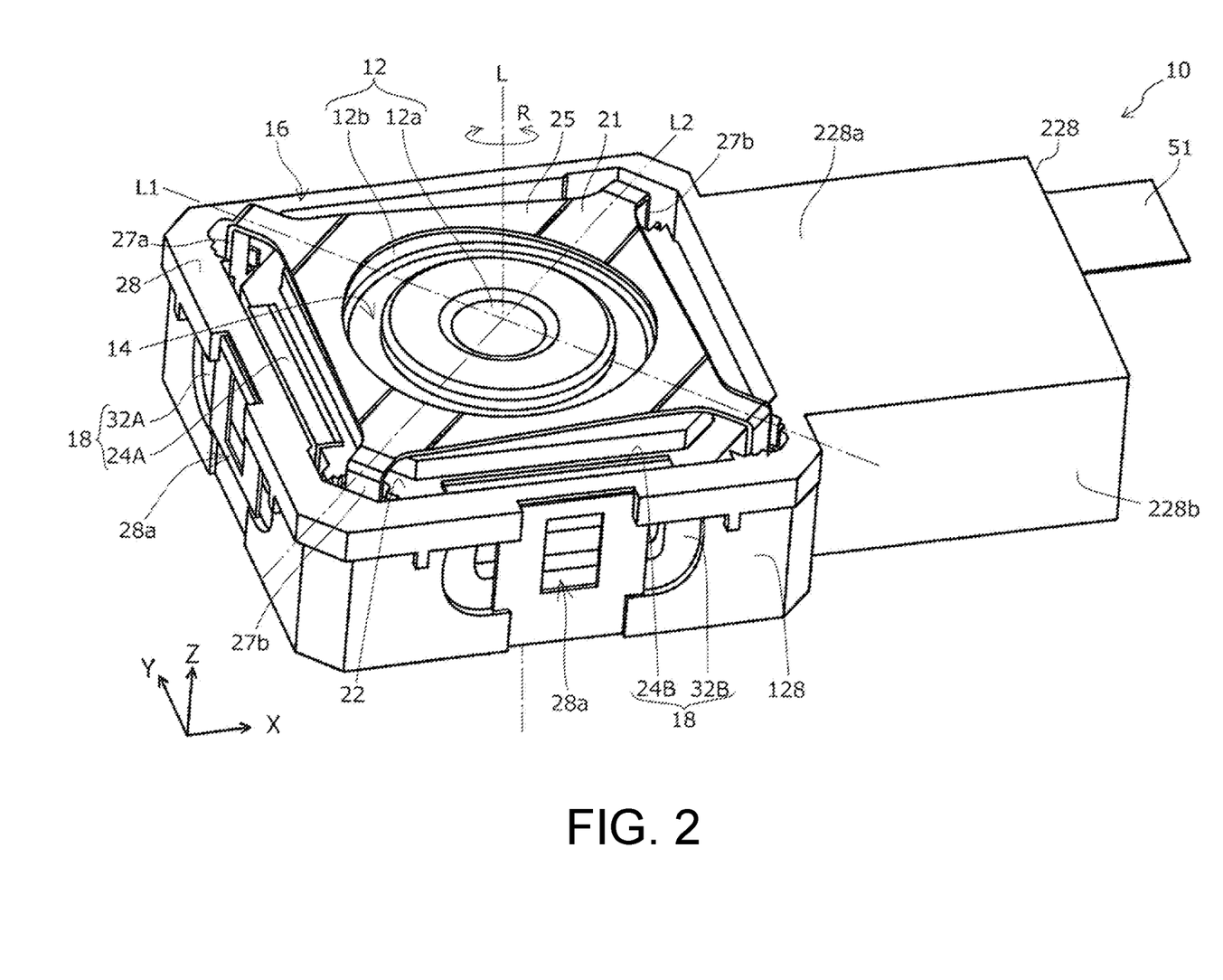
FIG. 2 is a perspective view of the optical unit according to at least an embodiment of the present invention.
Figure 3:
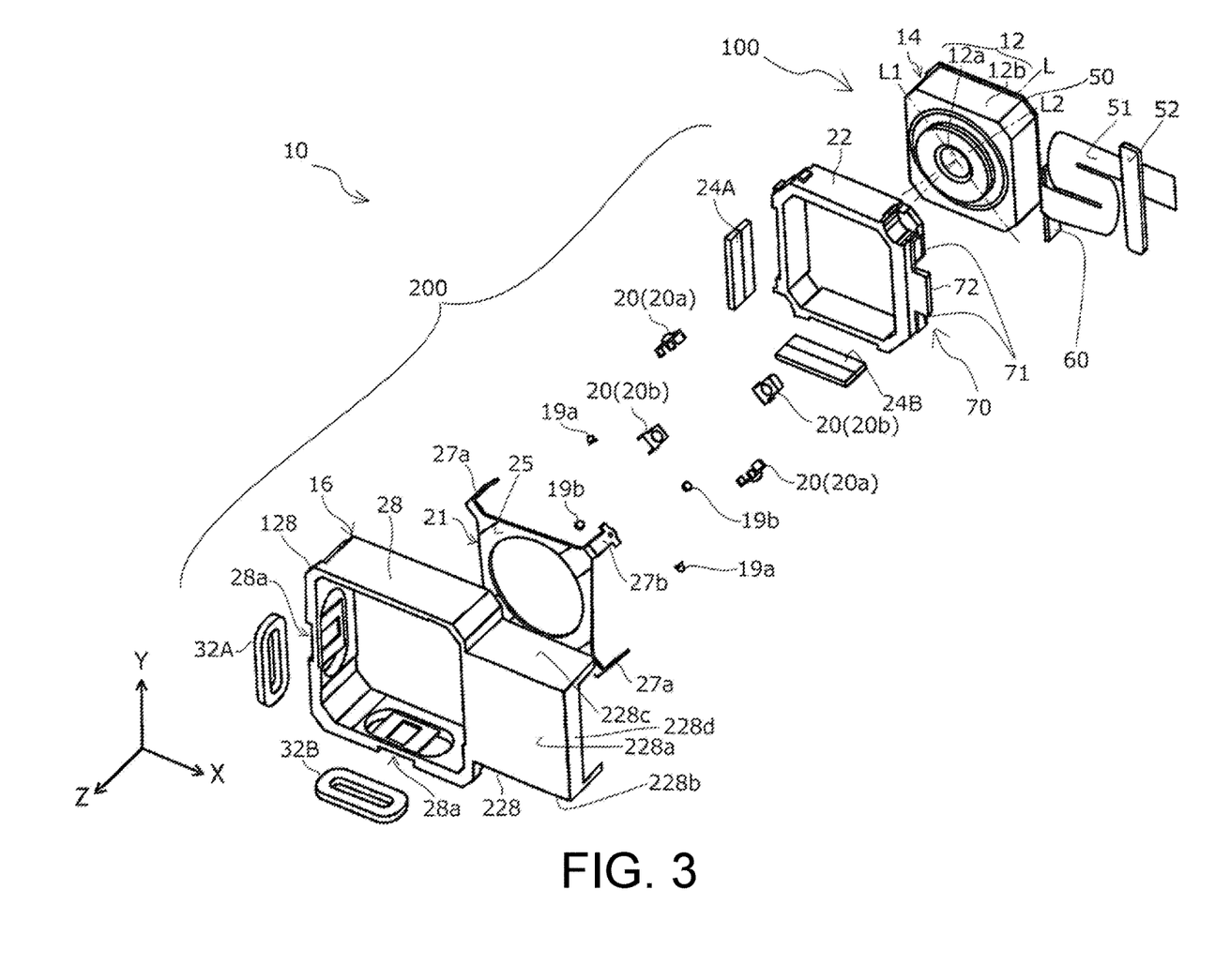
FIG. 3 is an exploded perspective view of the optical unit according to at least an embodiment of the present invention.

Hereinafter, an optical unit 10 according to at least an embodiment of the present invention will be described, referring to FIG. 1 to FIG. 7. In FIG. 2 and FIG. 3, a dash dot line marked with a sign L indicates an optical axis, a dash dot line marked with a sign L1 indicates a first axis line intersecting the optical axis, and a dash dot line marked with a sign L2 indicates a second axis line L2 intersecting the optical axis L and the first axis line L1. And, an R direction is a direction around the optical axis. In each figure, the Z-axis direction is the optical axis direction, the X-axis direction is the direction intersecting the optical axis, in other words, the yawing axis direction, and the Y-axis direction is the direction intersecting the optical axis, in other words, a pitching axis direction.

[Outline of Overall Configuration of Optical Unit]

Using FIG. 1 to FIG. 4, an outline of the configuration of the optical unit 10 according to the present embodiment will be described. The optical unit 10 has a movable body 14 provided with an optical module 12, such as a lens 12a, and an imaging element 50, and a fixed body 16 that is held in a state displaceable in a direction (pitching direction) with the Y-axis direction as a rotation axis (swing axis) and in a direction (yawing direction) with the X-axis direction as a rotation axis (swing axis). Also provided are a rotation drive mechanism 18 to drive the movable body 14 in the pitching direction and the yawing direction, and a support mechanism 20 to support the movable body 14 so that the movable body 14 can rotate (swing) in the pitching direction and yawing direction relative to the fixed body 16. Further, the optical unit 10 is provided with a gimbal mechanism 21 in which a first support portion 19a, by which the movable body 14 is supported in a manner to rotate around a first axis line L1, is provided in a first support portion-directed extended portion 27a, and a second support portion 19b, which is supported by a member on the fixed body 16 side in a manner to rotate around a second axis line L2, is provided in a second support portion-directed extended portion 27b (see FIG. 3).

As shown in FIG. 3, the optical unit 10 of the present embodiment has a movable unit 100 and a case 200 that houses the movable unit 100. Here, as shown in FIG. 3, the movable unit 100 is constituted by the optical module 12, the imaging element 50, the flexible circuit board 51 connected to the imaging element 50, and the like. The movable unit 100 constitutes a part of the movable body 14. A fixed frame 28, which is a housing portion in which the movable body 14 is housed in a swingable manner, a holder 22 having a fixing portion 70 that fixes the flexible circuit board 51, and the like constitute the case 200 that houses the movable unit 100. Although constituting a part of the case 200, the holder 22 can be regarded as constituting a part of the movable body 14 since the holder 22 swings relative to the fixed frame 28 together with the optical module 12.

[About Optical Module]

According to the present embodiment, the optical module 12 is in a form of a substantially rectangular housing, and is used, for example, as a thin camera mounted on a mobile phone with a camera, a tablet PC, or the like. The optical module 12 is provided with the lens 12*a* on a subject side, and optical equipment and the like for imaging are built into a rectangular housing 12*b*. The optical module 12 in the present embodiment, as an example, incorporates an actuator that corrects a pitching runout (runout in the direction of rotation with the Y-axis direction as the rotation axis) and a yawing runout (runout in the direction of rotation with the X-axis direction as the rotation axis) which are generated in the optical module 12, and is configured to be capable of correcting the pitching runout and the yawing runout.

According to the present embodiment, the optical module 12 is so configured as to be capable of correcting the pitching runout and the yawing runout, but is not limited to this configuration, and for example may be configured to be capable of correcting only one of the pitching runout and the yawing runout. The imaging element 50 can also be considered to constitute a part of the optical module 12.

[About Movable Body]

In FIGS. 1 to 4, the movable body 14 is provided with the optical module 12, the holder 22, and magnets 24A and 24B. The holder 22 is configured as a rectangular frame-shaped member that surrounds the remaining four faces of the optical module 12, except the front face (the face on the subject side) on which the lens 12*a* of the optical module 12 is provided and the rear face on the opposite side. The holder 22 of the present embodiment is, as an example, configured to attach and detach the optical module 12. However, the optical module 12 and the holder 22 may be integrally configured. In the holder 22, using two faces opposing the fixed body 16, the magnets 24A and 24B for correcting the pitching and the yawing are attached to outer faces thereof.

[About Fixed Body]

In FIG. 1 to FIG. 4, the fixed body 16 has the fixed frame 28 and coils 32A and 32B. In the present embodiment, the fixed frame 28 includes a rectangular frame-shaped member 128 that is provided in a manner to surround at least three faces of the holder 22 of the movable body 14 in the direction around the optical axis (R direction), an extended portion 228 that extends outwardly along the X-axis direction and includes a wall portion 228*a*, a wall portion 228*b*, a wall portion 228*c*, and a wall portion 228*d*. Here, the wall portion 228*a* is a wall portion covering the front face (face on subject side), the wall portion 228*b* and the wall portion 228*c* are wall portions covering the Y-axis direction, and the wall portion 228*d* is a wall portion covering the side opposite to the side on which the movable body 14 is arranged in the X-axis direction. Although omitted in FIG. 1 to FIG. 4, a wall portion is also provided on the side opposite to the wall portion 228*a* in the Z-axis direction.

The fixed body 16 of the present embodiment has a configuration in which the flexible circuit board 51 to be described below can be covered with the wall portion 228*a*, the wall portion 228*b*, the wall portion 228*c*, the wall portion 228*d*, and an unshown wall portion on the side opposite to the wall portion 228*a*, and there is provided a positioning portion 52 that positions the flexible circuit board 51 in the Y-axis direction and the Z-axis direction of the flexible circuit board 51 (see FIG. 4). Providing the cover that covers at least a part of the flexible circuit board 51, as in the optical unit 10 of the present embodiment, can suppress the flexible circuit board 51 from being damaged by contact with any other component or the like.

As shown in FIG. 2 and the like, the coils 32A and 32B are respectively mounted to coil mounting portions 28A. According to the present embodiment, although being configured as wound coils, as an example, the coils 32A and 32B may also be patterned substrates (coil substrates) in which the coils are incorporated, as patterns, into a substrate wiring.

According to the present embodiment, the magnet 24A and the coil 32A, the magnet 24B and the coil 32B, are in an opposing state when the movable body 14 is arranged in the fixed body 16. According to the present embodiment, a pair of the magnet 24A and the coil 32A, and a pair of the magnet 24B and the coil 32B constitute the rotation drive mechanism 18. The rotation drive mechanism 18 corrects the pitching and yawing of the movable body 14.

The correcting of the pitching and yawing is performed as follows. When the optical unit 10 is subjected to runout in both or any one of the pitching direction and the yawing direction, the runout is detected by an unshown magnetic sensor (Hall element), and the rotation drive mechanism 18 is driven based on a result of the runout. Alternatively, a runout detection sensor (gyroscope) or the like may be used to detect the runout of the optical unit 10. Based on the detection result of the runout, the rotation drive mechanism 18 so acts as to correct the runout. That is, a current is passed through each of the coils 32A and 32B in a manner to move the movable body 14 in a direction that cancels out the runout of the optical unit 10, thereby correcting the runout.

Thus, the optical unit 10 of the present embodiment is provided with the rotation drive mechanism 18 that rotates the movable body 14 relative to the fixed body 16, with the axial directions of the pitching and the axial direction of yawing as the rotation axes. Here, the rotation drive mechanism 18 is preferably arranged at a position other than the side (+X direction side) in the X-axis direction where the flexible circuit board 51 is arranged relative to the movable body 14. This is because the rotation drive mechanism 18 can be arranged on the side on which the flexible circuit board 51 is not formed, so there is no need to enlarge the optical unit 10 so as to suppress contact between the rotation drive mechanism 18 and the flexible circuit board 51, and the optical unit 10 can be made smaller. The term "rotation" in the present description does not require 360° rotation, but means including the case of swinging in the direction of rotation.

A drive source for the operation to correct the runout is not limited to a voice coil motor composed of a pair of the coil 32A and the magnet 24A and a pair of the coil 32B and the magnet 24B, such as the rotation drive mechanism 18. Any other drive source such as one using a stepping motor and a piezoelectric device can also be used.

[About Support Mechanism]

The support mechanism 20 has a sheet metal 20*a* that forms a hemispherical convex curved face toward the outside of the optical unit 10, and a sheet metal 20*b* that forms a hemispherical convex curved face toward the inside of the optical unit 10. The sheet metal 20*a* is arranged at two opposite locations among the four corners of the rectangular frame-shaped member 128 of the fixed body 16, and the sheet metal 20*b* is arranged at two opposite locations among the four corners of the rectangular frame-shaped movable body 14. The rectangular frame-shaped member 128 and the rectangular frame-shaped movable body 14 are arranged so that the positions of the four corners are aligned, and the sheet metal 20*a* and the sheet metal 20*b* are arranged one by one in the four corners.

In the support mechanism 20 of the present embodiment, the first support portion 19*a* provided on the first support portion-directed extended portion 27*a* of the gimbal mechanism 21 is arranged inside the hemispherical convex curved face of the sheet metal 20a facing outward. The support mechanism 20 supports the gimbal mechanism 21 relative to the fixed body 16 in such a configuration. The second support portion 19b provided on the second support portion-directed extended portion 27b of the gimbal mechanism 21 is arranged inside the hemispherical convex curved face of the inward-facing sheet metal 20b. The support mechanism 20, with the above configuration, supports the gimbal mechanism 21 relative to the movable body 14. That is, the support mechanism 20 of the present embodiment is so configured that the movable body 14 can be supported in a manner to rotate relative to the fixed body 16 with one or more directions (at least one of the X-axis direction and the Y-axis direction) intersecting the optical axis direction (Z-axis direction) as the rotation axis direction. Although the support mechanism 20 of the present embodiment is configured to allow rotation of the movable body 14 with the axial direction of pitching as the rotation axis and rotation of the movable body 14 with the axial direction of yawing as the rotation axis, the support mechanism 20 may also be configured to allow rotation of the movable body 14 in a rolling direction.

[Gimbal Mechanism]

The gimbal mechanism 21 is a mechanism which is formed by bending a metal flat plate material and which has a spring characteristic. Specifically, the gimbal mechanism 21, as an example, is composed of a gimbal frame portion 25 provided on the subject side, and the first support portion-directed extended portion 27a and the second support portion-directed extended portion 27b which are each formed by bending 90° in the optical axis direction from one of the four corner portions of the gimbal frame portion 25. The first support portion-directed extended portion 27a and the second support portion-directed extended portion 27b do not necessarily have to be entirely plate-like, and only a part thereof may be formed to be plate-like thereby to exhibit springiness. It is also possible to make one of the first support portion-directed extended portion 27a and the second support portion-directed extended portion 27b into another shape (such as a rod shape) other than the plate shape.

[Imaging Element]

Figure 4:
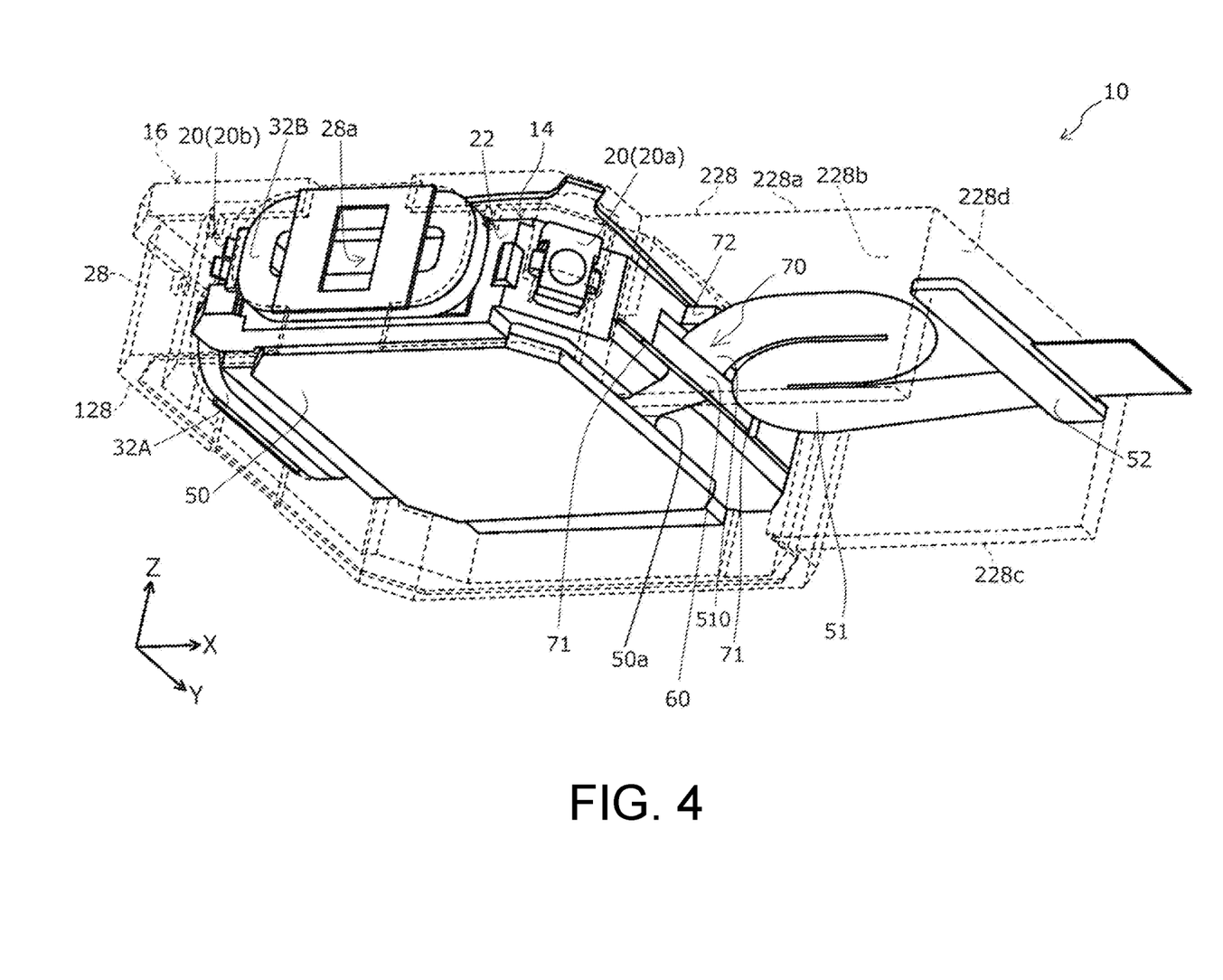
FIG. 4 is a perspective view of a fixed body of the optical unit according to at least an embodiment of the present invention, shown in a transparent manner.

As shown in FIG. 3 and FIG. 4, the optical module 12 is provided with the imaging element 50 on the side opposite to the subject side. And, as shown in FIG. 4, the flexible circuit board 51 is connected to a connection portion 50a of the imaging element 50. Here, the connection portion 50a of the imaging element 50 of the present embodiment is formed on the extended portion 228 side, and is configured to cover the flexible circuit board 51, with the wall portion 228a, the wall portion 228b, and the wall portion 228c of the extended portion 228, in a direction other than the side opposite the subject side. The connection portion 50a of the flexible circuit board 51 need not be provided in the imaging element 50, and may be provided in a portion other than the imaging element 50 of the movable body 14.

[Flexible Circuit Board]

As shown in FIG. 4, the flexible circuit board 51 has one end connected to the connection portion 50a provided on the movable body 14. And, as described above, the flexible circuit board 51 is arranged on the +X direction side relative to the movable body 14. Here, a reinforcing plate 60 is fixed to the one end side (connection portion 50a side) of the flexible circuit board 51 by being attached to a face 510 of the flexible circuit board 51, and the reinforcing plate 60 is fixed to the holder 22 at the fixing portion 70. The other end side (positioning portion 52 side) of the flexible circuit board 51 is positioned relative to the fixed frame 28 by being fixed to the extended portion 228 by the positioning portion 52. The flexible circuit board 51 of the present embodiment is composed of three layers (see FIG. 6).

[Fixing Portion]

Figure 5:
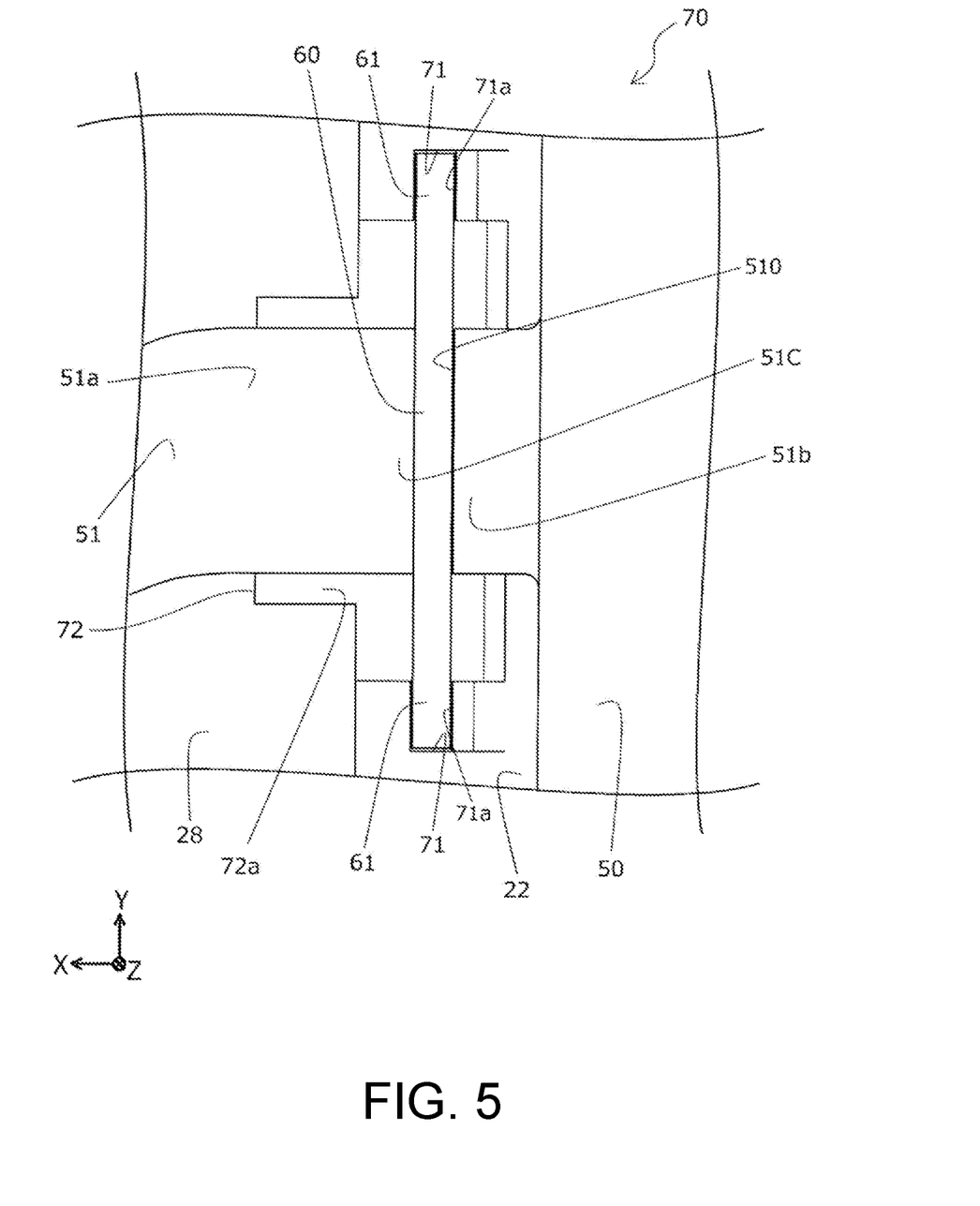
FIG. 5 is a bottom view showing the vicinity of a fixing portion of an optical unit according to at least an embodiment of the present invention.
Figure 6:
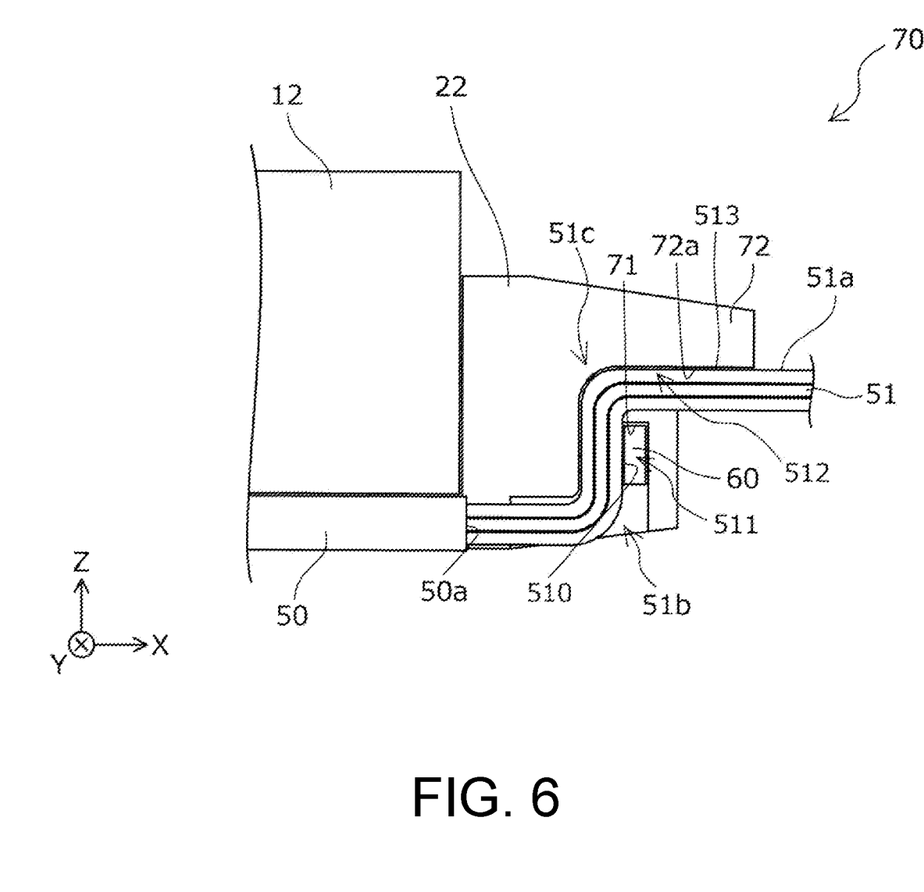
FIG. 6 is a side cross-sectional view showing the vicinity of a fixing portion of the optical unit according to at least an embodiment of the present invention.

In the following, in addition to FIG. 1 to FIG. 4, FIG. 5 to FIG. 7 will be used to describe a more detailed configuration of the fixing portion 70. As shown in FIG. 5 and FIG. 6 and the like, the fixing portion 70 is formed in the holder 22. The fixing portion 70 fixes the flat reinforcing plate 60 by sandwiching the flat reinforcing plate 60 with groove portions 71 formed on both the +Y direction side and the −Y direction side. The groove portion 71 extends in the Z-axis direction, and inserting the reinforcing plate 60 in the +Z direction to the groove portion 71 so that an end portion 61 of the reinforcing plate 60 fits to the groove portion 71 fixes the reinforcing plate 60 to the fixing portion 70.

Fixing the reinforcing plate 60 to the fixing portion 70 fixes the one end side (connection portion 50a side) of the flexible circuit board 51 to the holder 22 constituting the movable body 14. On the other hand, as described above, the flexible circuit board 51 is fixed at the other end side (positioning portion 52 side) to the fixed frame 28 that constitutes the fixed body 16. Accordingly, the flexible circuit board 51 is displaced as the movable body 14 swings relative to the fixed body 16. The flexible circuit board 51, when being short, may hinder the movable body 14 from swinging relative to the fixed body 16; due to this, the flexible circuit board 51 is so configured as to curve in an S-shape inside the extended portion 228 thereby to increase the length, and is configured so that the movable body 14 is not hindered from swinging relative to the fixed body 16. Since the flexible circuit board 51 of the present embodiment is composed of three layers as described above, it is difficult to bend the flexible circuit board 51 in the Z-axis direction thereby to increase the length thereof.

Also, as shown in FIG. 6, in the fixing portion 70, a pedestal 72 is formed in the holder 22 on which a placing face 72a is provided to place a face 513 (a face on the opposite side of the face 510) of the flexible circuit board 51 in an area 512 immediately at the other end side of an area 511 to which the reinforcing plate 60 is attached in the flexible circuit board 51. Because the fixing portion 70 has such a configuration, the flexible circuit board 51 to be connected to the connection portion 50a, toward the other end side, is formed with a first bend portion 51b, a second bend portion 51c, and a flat area 51a. An area between the first bend portion 51b and the second bend portion 51c corresponds to the area 511 to which the reinforcing plate 60 is attached and fixed to the fixing portion 70. The flat area 51a, that is, an area more on the other end side than the second bend portion 51c, corresponds to the area 512 that is placed on the placing face 72a and extends along the placing face 72a.

According to the present embodiment, the groove portion 71 is a direction along the Z-axis direction. Therefore, the area 511 is perpendicular to the area 512 (flat area 51a). However, the present embodiment is not limited to such a configuration. The extending direction of the groove portion 71 (insertion direction of the reinforcing plate 60) may be a direction different from the direction perpendicular to the flat area 51a. Expressing differently, adjusting the extending direction of the groove portion 71 (insertion direction of the reinforcing plate 60) can adjust the angle of the area 511 relative to the flat area 51a.

Figure 7:
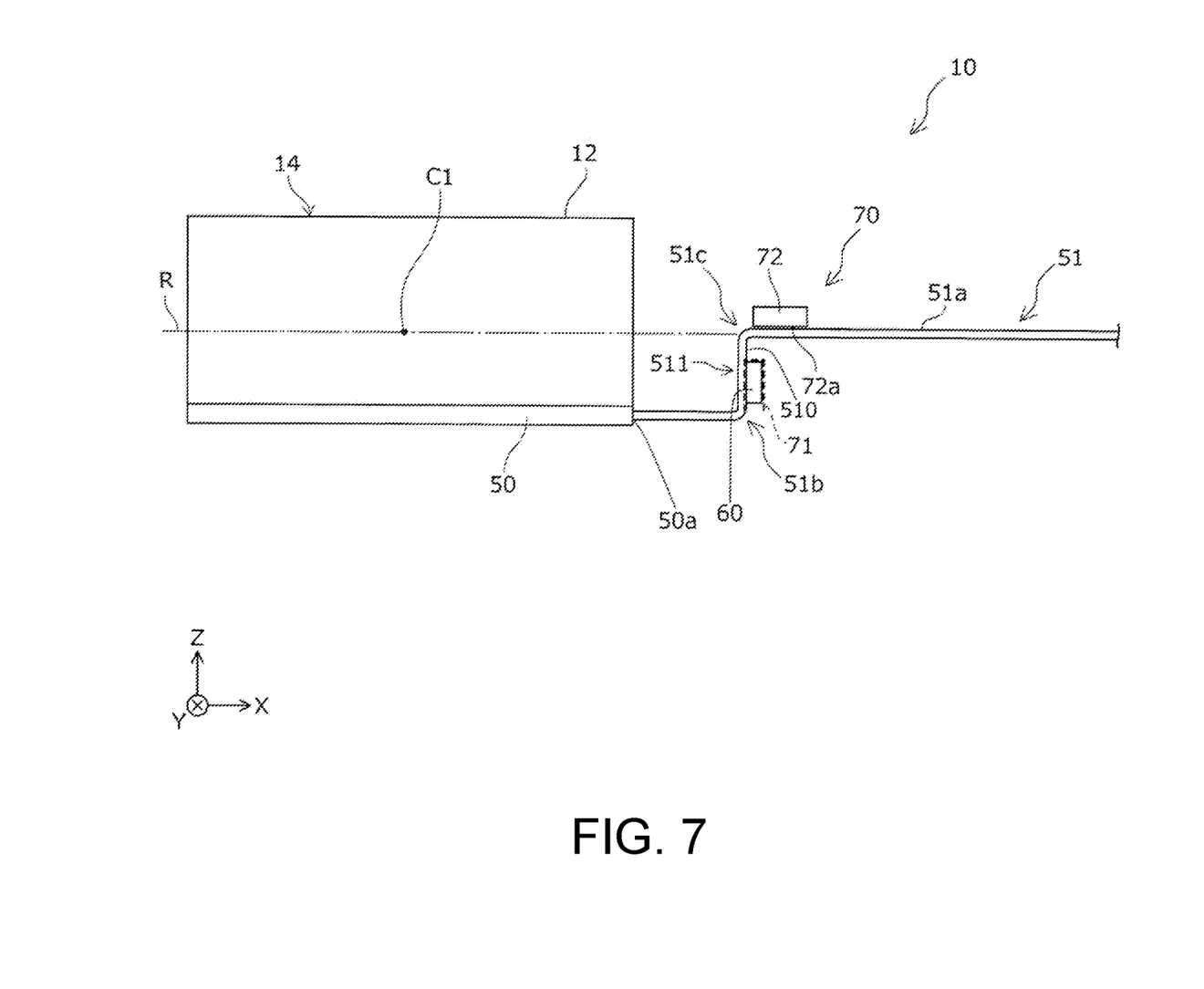
FIG. 7 is a schematic side view showing an arrangement of a flexible circuit board in the optical unit according to at least an embodiment of the present invention.

As shown in FIG. 7, the flat area 51a extends in a direction along the placing face 72a. And, on an extended line R in the −X direction of the flat area 51a, there is an arrangement in which a swing center C1 (a position of the rotation axis of pitching and the rotation axis of yawing) of the movable body 14 having the optical module 12 is present. Expressing differently, the arrangement is such that the swing center C1 of the movable body 14 having the optical module 12 is present on the extended line R in the −X direction of the placing face 72a.

Once summarizing here from the viewpoint of the case 200, the case 200 in the optical unit 10 of the present embodiment is a case that holds the movable unit 100 provided with the optical module 12 and the flexible circuit board 51 having one end connected to the optical module 12 at the connection portion 50a, and that holds the optical module 12 in a swingable manner. The case 200 is provided with the holder 22 which is swingable together with the optical module 12 and houses the optical module 12. Also provided is the fixing portion 70 that is provided at the holder 22 and fixes the flexible circuit board 51. Also provided is the pedestal 72 that is provided at the holder 22, and has the placing face 72a, along which the flexible circuit board 51 is caused to be, at the side (positioning portion 52 side) opposite to the one end side with respect to the area 511 fixed to the fixing portion 70 in the flexible circuit board 51. Here, the pedestal 72 is provided in a configuration in which the swing center C1 of the optical module 12 is positioned on the extended line R of the placing face 72a.

Depending on the arrangement of the flexible circuit board 51, the load applied to the flexible circuit board 51 when the optical module 12 is swung relative to the case 200 greatly varies. Here, arranging the flexible circuit board 51 so that the swing center C1 of the optical module 12 is positioned on the extended line R of the flat area 51a of the flexible circuit board 51 can reduce the load applied to the flexible circuit board 51 when the optical module 12 is swung relative to the case 200 can be reduced. And, with the simple configuration, that is, the pedestal 72 having the placing face 72a, the case 200 of the present embodiment is so configured that causing the flexible circuit board 51 to be along the placing face 72a of the pedestal 72 can arrange the flexible circuit board 51 such that the swing center C1 of the optical module 12 is positioned on the extended line R of the flat area 51a of the flexible circuit board 51. Due to this, the case 200 of the present embodiment is so configured as to reduce, with the simple configuration, the load applied to the flexible circuit board 51. Note that "the swing center C1 of the optical module 12 is positioned on the extended line R of the placing face 72a" does not mean only the configuration in which the swing center C1 of the optical module 12 is positioned, in a strict sense, on the extended line R of the placing face 72a, but also includes a configuration in which the swing center C1 of the optical module 12 is positioned approximately on the extended line R of the placing face 72a.

To summarize from the viewpoint of the optical unit 10, in the optical unit 10 of the present embodiment, the optical module 12 is swingably housed in the holder 22, and the flexible circuit board 51 is fixed to the fixing portion 70, so that the movable unit 100 is held by the case 200. Making such a configuration makes the optical unit 10 have a simple configuration that reduces the load applied to the flexible circuit board 51.

As described above, in the optical unit 10 of the present embodiment, the reinforcing plate 60 is fixed to the face 510 of the flexible circuit board 51, and the fixing portion 70 has the groove portion 71 into which the reinforcing plate 60 is inserted. In the optical unit 10 of the present embodiment, making such a configuration makes the fixing portion 70 of a simple configuration in which the reinforcing plate 60 to which the flexible circuit board 51 is fixed is simply inserted into the groove portion 71.

In detail, the groove portions 71 are configured in positions corresponding to both end portions of the longitudinal direction (Y-axis direction) of the reinforcing plate 60 and on both sides in the direction (Y-axis direction) intersecting the insertion direction (+Z direction) of the reinforcing plate 60, as shown in FIG. 5, and extend toward the placing face 72a in a direction along the insertion direction (Z-axis direction) of the reinforcing plate, as shown in FIG. 7. Configuring the groove portion 71 in such a manner can easily form a configuration in which the flexible circuit board 51 is fixed to the fixing portion 70 and the flexible circuit board 51 is caused to be along the placing face 72a.

Here, in the optical unit 10 of the present embodiment, it is so configured that the reinforcing plate 60 is press-fitted into the groove portion 71 by being pressed in the +X direction with a pressing portion 71a shown in FIG. 5, and is then attached with an adhesive. Making such a configuration can, with a simple configuration, securely fix the reinforcing plate 60 to the groove portion 71.

Here, the reinforcing plate 60 is preferably made of stainless steel or polyimide. Making such a configuration allows the reinforcing plate 60 to be formed easily and sturdily, and also reduces the risk of contaminating the flexible circuit board 51.

Next, an embodiment of an optical unit 11 different from the optical unit 10 shown in FIG. 1 to FIG. 7 will be described with reference to FIG. 8 and FIG. 9. In the optical unit 11 of the present embodiment shown in FIG. 8 and FIG. 9, no reinforcing plate is fixed to the flexible circuit board 51. However, the optical unit 11 of the present embodiment has a flat plate shaped pressing portion 80 that is configured separately from the flexible circuit board 51. The optical unit 11 of the present embodiment has the same configuration as that of the optical unit 10, except that the flexible circuit board 51 has the pressing portion 80 instead of the reinforcing plate being fixed to the flexible circuit board 51.

In the optical unit 11 of the present embodiment, the flexible circuit board 51 is arranged in the holder 22 in the same manner as in the optical unit 10. Then, inserting and fixing the pressing portion 80 in the +Z direction to the groove portion 71 in a manner from the state shown in FIG. 8 to the state shown in FIG. 9 positions the flexible circuit board 51 on the holder 22. As shown in FIG. 8, an end portion 71b on the −Z direction side of the groove portion 71 is configured so that the gap becomes wider as the end portion 71b goes outward (−Z direction side), for easy inserting of the pressing portion 80. However, the above configuration is also the same for the optical unit 10.

Thus, in the optical unit 11 of the present embodiment, the fixing portion 70 includes the pressing portion 80 that is configured separately from the flexible circuit board 51 and presses the flexible circuit board 51, which is in a state of being placed on the placing face 72a, toward one face of the holder 22 (in another expression, sandwiches the flexible circuit board 51 together with the holder 22), and the groove portion 71 into which the pressing portion 80 is inserted. The optical unit 11 of the present embodiment, by having the above configuration, can make the fixing portion 70 that has a simple configuration in which the pressing portion 80 is simply inserted into the groove portion 71. Making such a configuration is particularly effective in a case where the reinforcing plate cannot be fixed to the flexible circuit board 51. Further, it is also possible to use differently shaped pressing portions 80 according to the shape of the holder 22 to be used, thereby making it possible to increase the versatility of the optical module 12.

Figure 8:
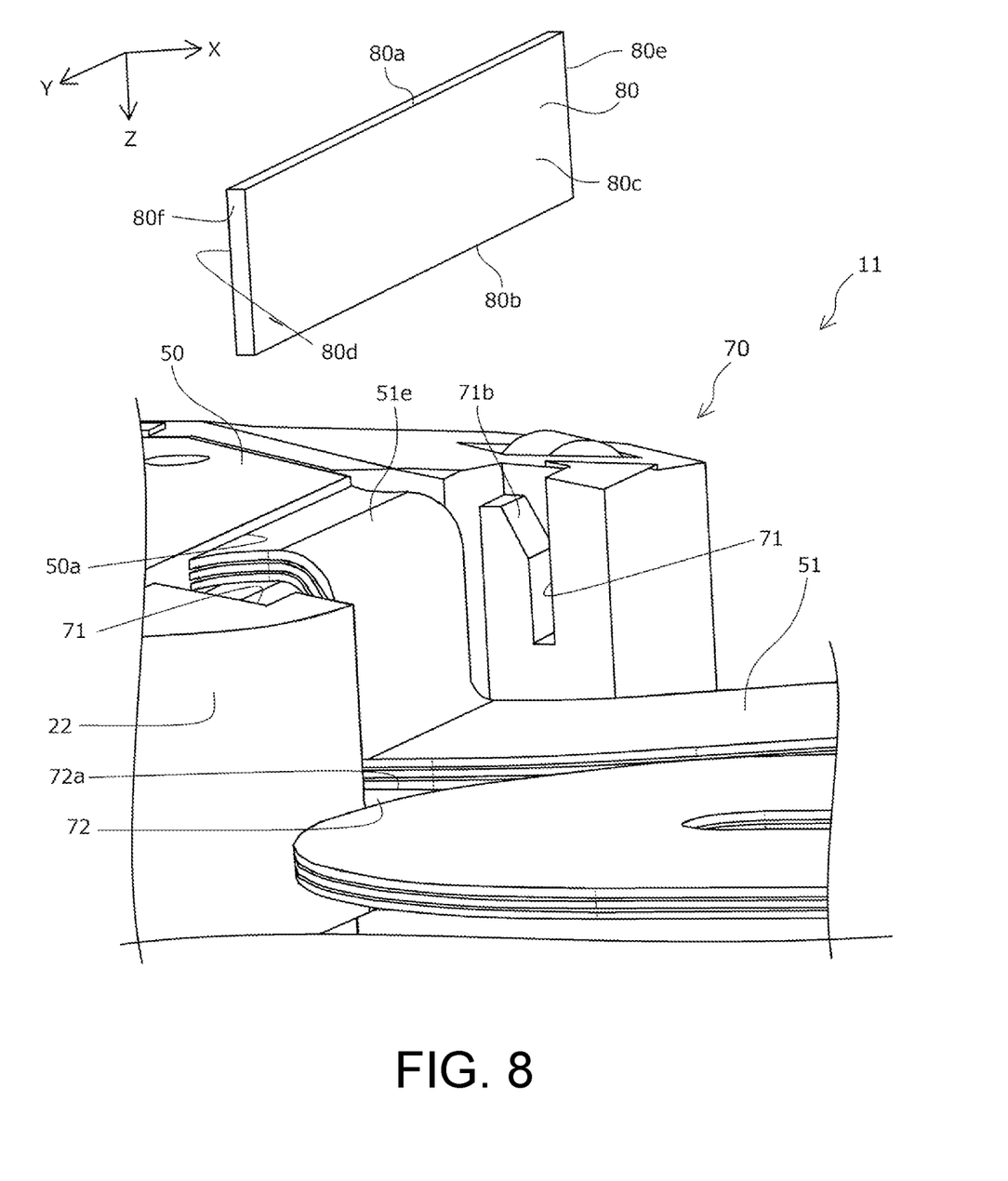
FIG. 8 is a perspective view of the interior of the optical unit according to at least an embodiment of the present invention different from FIG. 1 to FIG. 7, showing the state before inserting a pressing portion into a groove portion.
Figure 9:
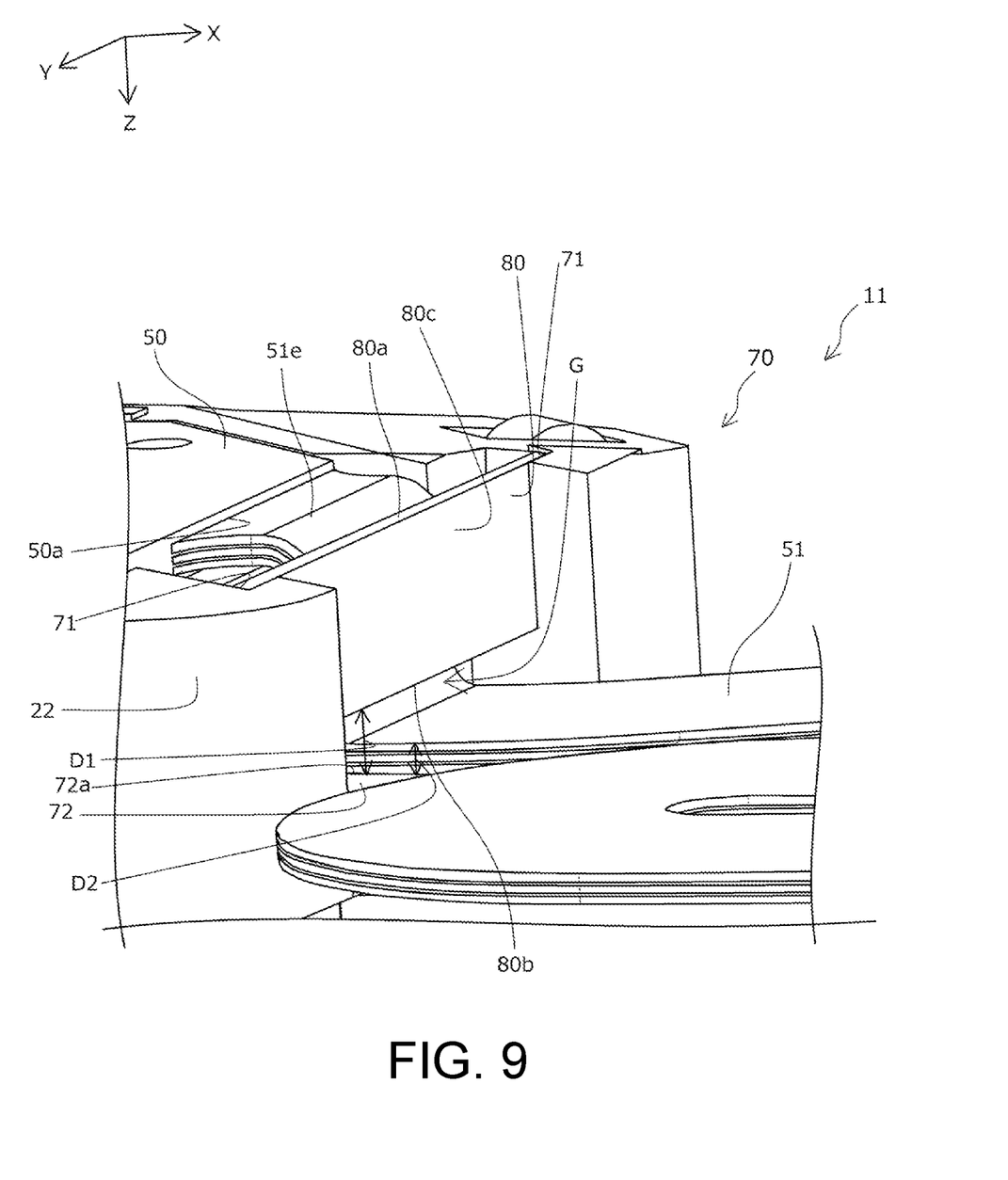
FIG. 9 is a perspective view of the interior of an optical unit according to at least an embodiment of the present invention different from FIG. 1 to FIG. 7, showing the state after inserting the pressing portion into the groove portion.

In the optical unit 11 of the present embodiment, as shown in FIG. 8 and FIG. 9, the groove portions 71 are configured in the positions corresponding to both end portions of the longitudinal direction (Y-axis direction) of the pressing portion 80 and on both sides in the direction (Y-axis direction) intersecting the insertion direction (+Z direction) of the pressing portion 80. As shown in FIG. 8, toward the placing face 72a, the groove portion 71 extends in the direction (Z-axis direction) along the insertion direction of the pressing portion. The optical unit 11 of the present embodiment, by having such a configuration, can easily form the configuration in which the flexible circuit board 51 is fixed to the fixing portion 70 and the flexible circuit board 51 is caused to be along the placing face 72a (caused to be along the X-axis direction).

In the optical unit 11 of the present embodiment, as shown in FIG. 9, an upstream end portion 80a in the insertion direction of the pressing portion 80 more protrudes in the −Z direction than a surface 51e on the −Z direction side of the flexible circuit board 51. Expressing differently, the pressing portion 80 protrudes relative to the flexible circuit board 51 which is in the state where the upstream end portion 80a in the insertion direction of the pressing portion 80 is fixed to the fixing portion 70. The optical unit 11 of the present embodiment, by having the above configuration, makes it easy to insert the pressing portion 80 into the groove portion 71. The feature that the upstream end portion 80a protrudes more in the −Z direction than the surface 51e on the −Z direction side of the flexible circuit board 51 means that, it is sufficient if the average position of the upstream end portion 80a in the −Z direction side is positioned more on the −Z direction side than the average position of the surface 51e on the −Z direction side of the flexible circuit board 51.

In the optical unit 11 of the present embodiment, as shown in FIG. 9, a gap G between a downstream end portion 80b in the insertion direction of the pressing portion 80 and the placing face 72a is wider than a thickness D2 of the flexible circuit board 51. Expressing differently, the pressing portion 80 is arranged such that the distance D1 between the downstream end 80b of the pressing portion 80 in the insertion direction and the placing face 72a is greater than the thickness D2 of the flexible circuit board 51. The optical unit 11 of the present embodiment, by having such a configuration, can suppress the flexible circuit board 51 from being damaged by pressing at a strong force, with the pressing portion 80, the flexible circuit board 51 to the placing face 72a.

Here, in the optical unit 11 of the present embodiment, the flexible circuit board 51 is composed of a plurality of flexible circuit boards (three boards) stacked on top of each other, as shown in FIG. 8 and FIG. 9. Here, the feature that the distance D1 between the downstream end portion 80b in the insertion direction of the pressing portion 80 and the placing face 72a is greater than the thickness D2 of the flexible circuit board 51 means that, the flexible circuit board 51 is so arranged that the distance D1 is greater than the overall thickness (thickness D2) of the plurality of stacked flexible circuit boards 51.

As described above, in the optical unit 11 of the present embodiment, the flexible circuit board 51 is composed of a plurality of flexible circuit boards 51 stacked on top of each other, but the flexible circuit board 51 may be composed of a single flexible circuit board. In that case, it is preferable that the arrangement is such that the distance D1 is greater than the thickness (thickness D2) of one flexible circuit board 51.

In the optical unit 11 of the present embodiment, the pressing portion 80 is press-fitted into the groove portion 71 and is then attached with an adhesive. The optical unit 11 of the present embodiment, by having the above configuration, can securely fix the pressing portion 80 to the groove portion 71 with a simple configuration.

The pressing portion 80 is preferably made of metal or resin, in particular, stainless steel or polyimide. Making such a configuration allows the pressing portion 80 to be formed easily and sturdily, and also can reduce the risk of contaminating the flexible circuit board 51.

As shown in FIG. 8, in the optical unit 11 of the present embodiment, the pressing portion 80 is a flat plate having four side-like portions, that is, the upstream end portion 80a, the downstream end portion 80b, a side end portion 80e, and a side end portion 80f, and a +X direction side surface 80c and a −X direction side surface 80d. Here, the upstream end portion 80a and the downstream end portion 80b are straight lines along the Y-axis direction, and the side end portion 80e and the side end portion 80f are straight lines along the Z-axis direction. The +X direction side surface 80c and the −X direction side surface 80d are flat orthogonal to the X-axis direction. The pressing portion 80, by having such a configuration, can securely press the flexible circuit board 51 without a distortion.

However, there is no particular limitation to the configuration of the pressing portion 80. For example, the pressing portion 80 may be a rod-shaped member such as a cylinder or a square prism extending in the Y-axis direction. For example, the pressing portion 80, when being composed of a cylindrical member, can reduce the risk that the flexible circuit board 51 is damaged when the pressing portion 80 contacts the flexible circuit board 51. Therefore, for example, it is possible to make a configuration in which the pressing portion 80 presses the flexible circuit board 51 to the placing face 72a also.

The present invention is not limited to the above embodiments, but can be realized in various configurations to the extent that the purpose thereof is not departed from. For example, the technical features in the embodiments corresponding to the technical features in each of the modes described in the SUMMARY may be replaced or combined as appropriate to solve some or all of the above problems or to achieve some or all of the above effects. If the technical feature is not described as essential in the description, such a technical feature can be deleted as appropriate.

What is claimed is:
1. An optical unit comprising:
a case which holds a movable unit, which is provided with an optical module and a flexible circuit board having one end connected to the optical module, in a swingable manner that the optical module is swingable,
wherein the case comprises:
a holder, being swingable together with the optical module and housing the optical module, the holder being configured as a rectangular frame-shaped member that surrounds the optical module;
a fixing portion, being provided at the holder to fix the flexible circuit board; and
a pedestal, being provided at the holder so as to protrude from the rectangular frame-shaped member to an outer side with respect to the optical module, and the pedestal having a placing face along which a side of the flexible circuit board that is away from the one end is disposed, wherein a swing center, that is an intersecting position of a rotation axis of pitching and a rotation axis of yawing, of the optical module is located in an inside of the optical module, the pedestal is provided in a configuration in which the swing center of the optical module is positioned on an extended line of the placing face, the flexible circuit board is fixed with a reinforcing plate, the fixing portion has a groove portion, into which the reinforcing plate is inserted, on both sides in a direction intersecting an insertion direction of the reinforcing plate with respect to the flexible circuit board, and the groove portion extends toward the placing face along the insertion direction of the reinforcing plate, the reinforcing plate fixed to the flexible circuit board is inserted to the groove portion toward the placing face and fixed to the fixing portion and thereby, the flexible circuit board is formed with a first bend portion, a second bend portion and a flat area along the placing face of the pedestal, and an area between the first bend portion and the second bend portion is fixed to the fixing portion by the reinforcing plate, and the flat area of the flexible circuit board is extended and disposed on the placing face in a direction toward the swing center located in the inside of the optical module.

2. The optical unit according to claim 1, wherein the reinforcing plate is configured to be press-fitted into the groove portion and is attached with an adhesive.

3. The optical unit according to claim 1, wherein the reinforcing plate is made of stainless steel or polyimide.

4. An optical unit comprising:
a case which holds a movable unit, which is provided with an optical module and a flexible circuit board having one end connected to the optical module, in a swingable manner that the optical module is swingable,
wherein the case comprises:
  a holder, being swingable together with the optical module and housing the optical module, the holder being configured as a rectangular frame-shaped member that surrounds the optical module;
  a fixing portion, being provided at the holder to fix the flexible circuit board; and
  a pedestal, being provided at the holder so as to protrude from the rectangular frame-shaped member to an outer side with respect to the optical module, and the pedestal having a placing face along which a side of the flexible circuit board that is away from the one end is disposed, wherein a swing center, that is an intersecting position of a rotation axis of pitching and a rotation axis of yawing, of the optical module is located in an inside of the optical module, the pedestal is provided in a configuration in which the swing center of the optical module is positioned on an extended line of the placing face, the fixing portion comprises a flat plate shaped pressing portion that is configured separately from the flexible circuit board, the fixing portion has a groove portion, into which the flat plate shaped pressing portion is inserted, on both sides in a direction intersecting an insertion direction of the flat plate shaped pressing portion with respect to the flexible circuit board, and the groove portion extends toward the placing face along the insertion direction of the flat plate shaped pressing portion, the flat plate shaped pressing portion is inserted to the groove portion toward the placing face and fixed to the fixing portion and thereby, the flexible circuit board is pressed toward one face of the holder and is formed with a first bend portion, a second bend portion and a flat area along the placing face of the pedestal, and an area between the first bend portion and the second bend portion is fixed to the fixing portion by the flat plate shaped pressing portion, and the flat area of the flexible circuit board is extended and disposed on the placing face in a direction toward the swing center located in the inside of the optical module.

5. The optical unit according to claim 4, wherein the pressing portion is configured to protrude relative to the flexible circuit board which is in a state where an upstream end portion in the insertion direction of the pressing portion is fixed to the fixing portion.

6. The optical unit according to claim 4, wherein the pressing portion is arranged such that a distance between a downstream end portion of the pressing portion in the insertion direction and the placing face is greater than a thickness of the flexible circuit board.

7. The optical unit according to claim 6, wherein the flexible circuit board comprises a plurality of flexible circuit boards stacked with each other, and the flexible circuit board is arranged so that the distance is greater than an overall thickness of the plurality of flexible circuit boards that are stacked.

8. The optical unit according to claim 6, wherein the flexible circuit board comprises a single flexible circuit board.

9. The optical unit according to claim 4, wherein the pressing portion is configured to be press-fitted into the groove portion and is attached with an adhesive.

10. The optical unit according to claim 4, wherein the pressing portion is made of stainless steel or polyimide.

* * * * *